(12) United States Patent
Williams et al.

(10) Patent No.: US 8,579,623 B2
(45) Date of Patent: Nov. 12, 2013

(54) EXTRUDER STABILIZER ASSEMBLY

(76) Inventors: Edward Williams, St. Louis, MO (US); Alan Eugene Kirkland, Crystal City, MO (US)

( * ) Notice: Subject to any disclaimer, the term of this patent is extended or adjusted under 35 U.S.C. 154(b) by 582 days.

(21) Appl. No.: 12/762,509

(22) Filed: Apr. 19, 2010

(65) Prior Publication Data

US 2010/0203184 A1 Aug. 12, 2010

Related U.S. Application Data

(63) Continuation-in-part of application No. 12/100,964, filed on Apr. 10, 2008, now abandoned.

(60) Provisional application No. 61/170,816, filed on Apr. 20, 2009.

(51) Int. Cl.
*B29C 47/08* (2006.01)
*B29C 47/60* (2006.01)

(52) U.S. Cl.
USPC ............... 425/192 R; 425/206; 425/376.1; 425/461

(58) Field of Classification Search
USPC ............... 425/192 R, 206, 376.1, 461, 467
See application file for complete search history.

(56) References Cited

U.S. PATENT DOCUMENTS

| | | | |
|---|---|---|---|
| 2,661,497 A | 12/1953 | Birmingham | |
| 2,946,089 A | 7/1960 | Heston | |
| 3,130,468 A | 4/1964 | McFall | |
| 3,592,128 A | 7/1971 | French | |
| 3,613,603 A * | 10/1971 | Reisman | 425/376.1 |
| 3,696,913 A | 10/1972 | Anders | |
| 3,708,256 A | 1/1973 | Kopp | |
| 3,756,758 A | 9/1973 | Prall | |
| 4,324,748 A | 4/1982 | Hatakeyama et al. | |
| 4,470,790 A | 9/1984 | Harada et al. | |
| 4,504,210 A | 3/1985 | Titz et al. | |
| 4,514,348 A | 4/1985 | Iguchi et al. | |
| 4,574,609 A | 3/1986 | Berecz | |
| 4,687,433 A | 8/1987 | Ozaki et al. | |
| 4,708,618 A | 11/1987 | Reifenhauser et al. | |
| 4,752,196 A | 6/1988 | Wolfe, Jr. | |
| 4,752,205 A | 6/1988 | Moriyama et al. | |
| 4,806,086 A | 2/1989 | Bloch et al. | |
| 4,856,974 A | 8/1989 | Wolfe, Jr. | |
| 5,067,885 A | 11/1991 | Stevenson et al. | |
| 5,110,276 A | 5/1992 | Farnsworth et al. | |
| 5,135,378 A | 8/1992 | Catton | |
| 5,238,385 A | 8/1993 | Johnson | |
| 5,268,050 A | 12/1993 | Azari | |
| 5,342,189 A | 8/1994 | Inamura et al. | |

(Continued)

FOREIGN PATENT DOCUMENTS

WO 2005110669 A1 11/2005

*Primary Examiner* — Yogendra Gupta
*Assistant Examiner* — Joseph Leyson
(74) *Attorney, Agent, or Firm* — Gardere Wynne Sewell LLP

(57) ABSTRACT

A stabilizer assembly for use in an extruder having a screw rotating in a barrel is provided. The assembly comprises a plurality of rods that are secured to an interior of the barrel at one end. Each of the rods has an end that extends radially inwardly toward the center of the barrel. On the discharge end of the screw, there is a bearing member that is in contact with each of the opposite ends of the rods. The rods support the discharge end of the screw and stabilize its rotation in the barrel.

19 Claims, 7 Drawing Sheets

(56) References Cited

U.S. PATENT DOCUMENTS

| | | |
|---|---|---|
| 5,424,018 A | 6/1995 | Paul et al. |
| 5,498,380 A | 3/1996 | Sasaki |
| 5,609,600 A | 3/1997 | Love et al. |
| 5,718,926 A | 2/1998 | Dambrine et al. |
| 5,720,987 A | 2/1998 | Ploog |
| 5,762,975 A | 6/1998 | Rockstedt |
| 5,773,043 A | 6/1998 | Hunter |
| 5,855,963 A | 1/1999 | Urbanek et al. |
| 5,968,603 A | 10/1999 | Urbanek et al. |
| 6,015,226 A | 1/2000 | Weller et al. |
| 6,019,924 A | 2/2000 | Montalbano |
| 6,179,461 B1 | 1/2001 | Christiano et al. |
| 6,196,823 B1 | 3/2001 | Coyle et al. |
| RE37,235 E | 6/2001 | Hauck et al. |
| 6,244,849 B1 | 6/2001 | Bailey et al. |
| 6,296,468 B1 | 10/2001 | Deutsch et al. |
| 6,346,293 B1 | 2/2002 | Douris et al. |
| 6,352,426 B1 | 3/2002 | Hutchinson et al. |
| 6,497,713 B1 | 12/2002 | Tompkins et al. |
| 6,511,309 B1 | 1/2003 | Hunter |
| 6,634,781 B2 | 10/2003 | Bowens et al. |
| 6,786,630 B2 | 9/2004 | Haberer |
| 7,513,676 B2 | 4/2009 | Williams et al. |
| 7,764,155 B2 | 7/2010 | Williams et al. |
| 2003/0138515 A1* | 7/2003 | Harfmann ............ 425/379.1 |
| 2007/0237853 A1 | 10/2007 | Hsu |
| 2009/0258103 A1 | 10/2009 | Williams et al. |

\* cited by examiner

EXTRUDER STABILIZER ASSEMBLY

PRIORITY CLAIM AND CROSS-REFERENCE TO RELATED APPLICATION

This application claims priority to Provisional Application No. 61/170,816 filed on Apr. 20, 2009 and entitled "Extruder Stabilizer Assembly." Also, this application is a continuation-in-part application of patent application Ser. No. 12/100,964 filed on Apr. 10, 2008 and entitled "Multi-Head Extruder Assembly," now abondonded and hereby incorporated by reference for all purposes.

TECHNICAL FIELD

The present invention relates generally to extruders having screws for conveying and extruding material, such as pet food, through an extrusion die. More particularly, the present invention relates to an apparatus for centering and stabilizing those extruder screws in the housings or barrels in which they rotate.

BACKGROUND

Extruders are used for a number of purposes. One such purpose is to push an extrudate, such as pet food, through an extrusion die, where the pet food extrudate is cut off into pellets of desired shape and size. Typically, the flited extrusion screws are made of steel and the screw rotates in a housing or barrel. The screw shaft is supported only at the driven end (where it is coupled to a motor or transmission). The screw and its flites are centered in the housing by interaction between the screw flites, the extrudate, and the inner diameter of the housing (the theory being that the screw is supported by the extrudate and does not contact the interior of the barrel). Because steel screws are tough and fracture-resistant, this arrangement is satisfactory in most cases.

In the pet food application, among others, the extrudate is highly abrasive. Accordingly the screws and screw flites are covered with wear-resistant material, such as tungsten carbide, in the form of tiles or welded-on hardfacing. One such screw is disclosed in commonly assigned U.S. Pat. No. 7,513,676 to Williams et al., which is incorporated herein by reference. The wear- or abrasion-resistant material on such screws is hard but brittle, and can be damaged or destroyed by contact between the screw flites and the inner diameter or wall of the housing. This contact is not prevented by simply "floating" the screw on the extrudate. Accordingly, a need exists for a mechanism or apparatus for stabilizing a wear-resistant extrusion screw within the housing in which it rotates.

SUMMARY

In accordance with one embodiment of the present invention, a stabilizer assembly for use in an extruder having a screw rotating in a barrel is provided. There is a plurality of rods that is secured to an interior of the barrel at one end. Each of those rods has an end that extends radially inwardly toward the center of the barrel. On the discharge end of the screw, there is a bearing member that is in contact with each of the opposite ends of the rods. The rods support the discharge end of the screw and stabilize its rotation in the barrel.

In accordance with another embodiment of the present invention, the rods are secured to the interior of the barrel by threaded connections.

In accordance with another embodiment of the present invention, the rods are made of steel.

In accordance with another embodiment of the present invention, the rods are equally spaced from each other along the circumference of the interior of the barrel.

In accordance with another embodiment of the present invention, the ends of the rods are made of tungsten carbide.

In accordance with another embodiment of the present invention, each of the ends made of tungsten carbide has a smaller diameter than the diameter of each rod.

In accordance with another embodiment of the present invention, a stabilizer assembly for use in an extruder having a screw rotating in a housing is provided. The assembly comprises a plurality of cylinders that extend inwardly from an inner wall at one end of the housing toward the axis of the housing. The assembly further comprises a shaft on the extruding end of the screw. The shaft defines the axis and intersects each distal end of the cylinders. The cylinders center and stabilize the rotation of the shaft in the housing.

In accordance with another embodiment of the present invention, the cylinders are secured to the inner wall of the housing by threaded connections.

In accordance with another embodiment of the present invention, the cylinders are made of steel.

In accordance with another embodiment of the present invention, the cylinders are equally spaced from each other along the circumference of the inner wall of the housing.

In accordance with another embodiment of the present invention, each of the cylinders has a portion made of tungsten carbide.

In accordance with another embodiment of the present invention, each of the portions made of tungsten carbide is located between the cylinders and the shaft.

In accordance with another embodiment of the present invention, each of the portions made of tungsten carbide has a smaller diameter than the diameter of the cylinder.

In accordance with another embodiment of the present invention, a stabilizer assembly for use in an extruder having a housing in which a flited screw rotates is provided. The assembly comprises three rods, each of which is secured to the housing at one end and has an end extending radially inwardly toward the center of the housing. There is a bearing tip on the end of each rod and the bearing tips are formed of tungsten carbide. The assembly further comprises a bearing surface that is formed on a shaft of the screw and contacts the bearing tip of each rod.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
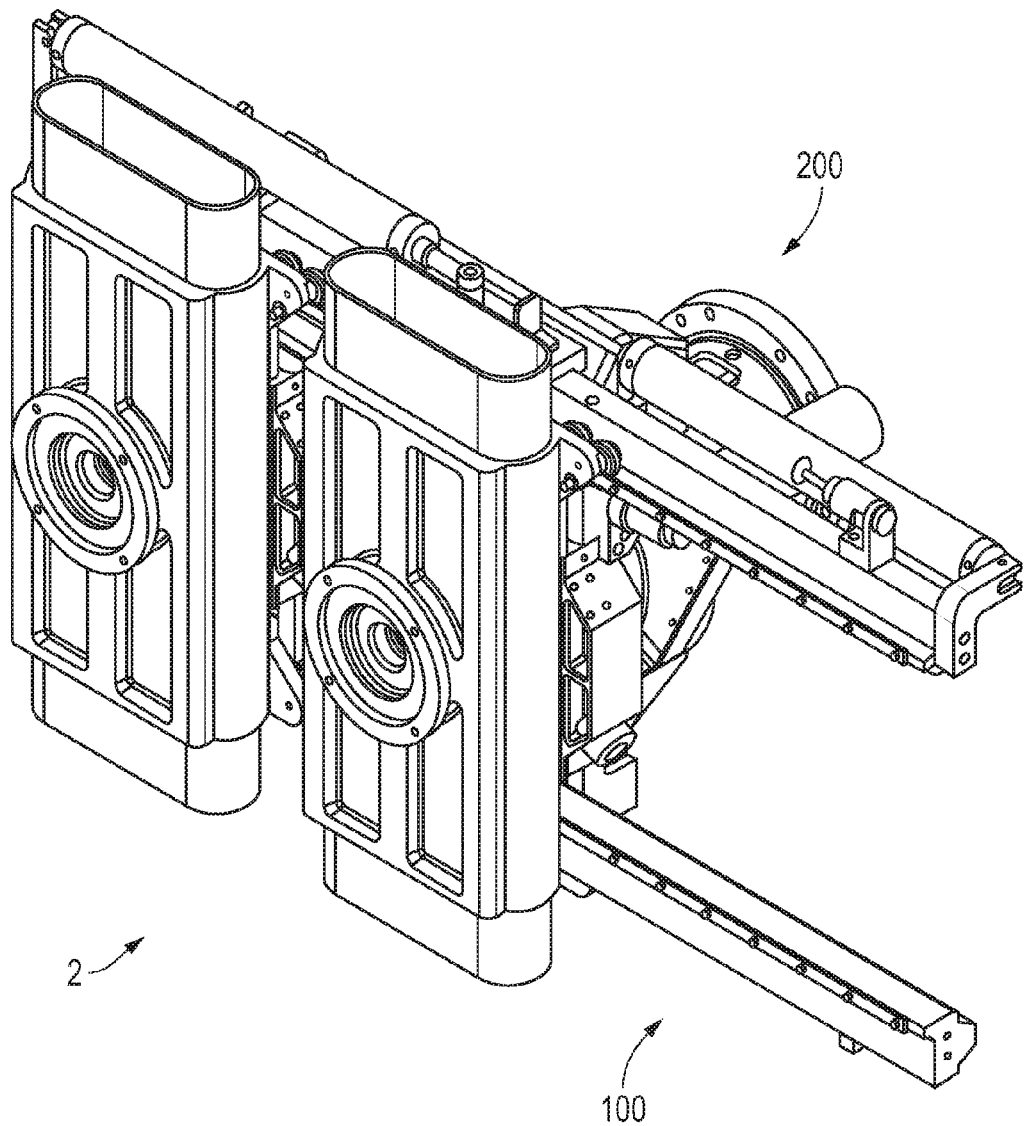
FIG. 1 is an isometric view of the extruder assembly including the stabilizer assembly in accordance with a preferred embodiment of the present invention.
Figure 2:
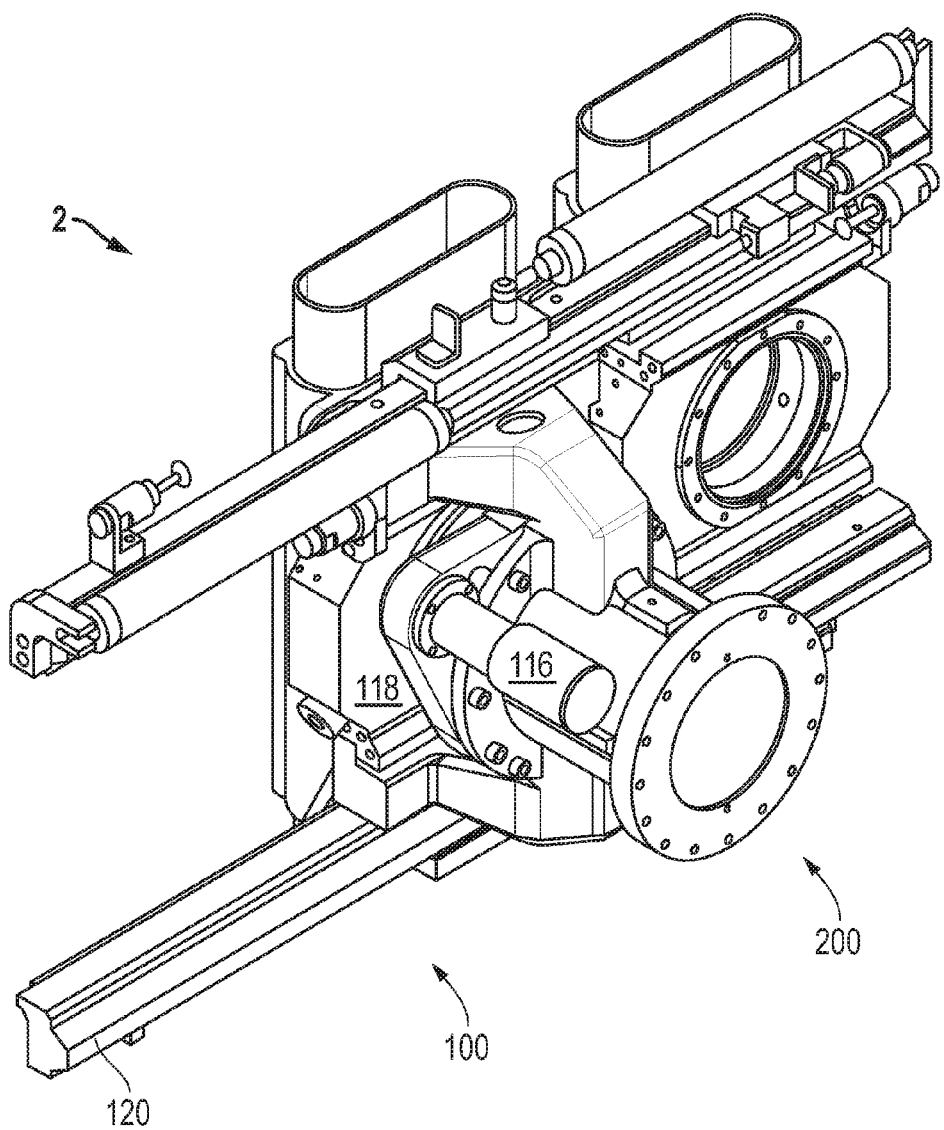
FIG. 2 is another isometric view of the extruder assembly of FIG. 1.
Figure 3:
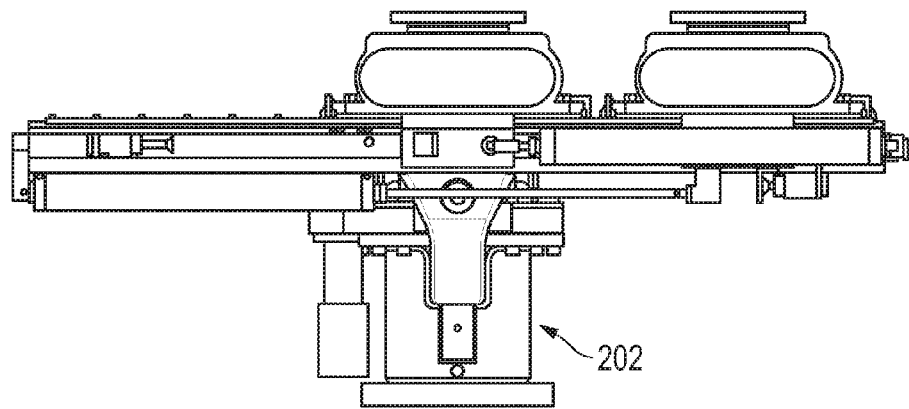
FIG. 3 is a top view of the extruder assembly of FIG. 1.

Refer now to the drawings wherein depicted elements are, for the sake of clarity, not necessarily shown to scale and wherein like or similar elements are designated by the same reference numeral through the several views.

With extruders, as with all manufacturing, throughput is important, and when a die plate is changed or repair is undertaken, the throughput is affected. In particular, extruders usually operate at high temperatures and pressures (sometimes greater than 300° F. and greater than 1000 PSI) to force an extrudate, such as plastic or food products, through a die. Thus, changing a die plate or undertaking a repair can take the extruder off-line for several hours or days, which can significantly affect the productivity and profitability of the extruder.

Referring to FIGS. 1-7 of the drawings, an extruder assembly 2 is shown having multiple heads. The assembly 2 is comprised of a multi-head assembly 100 and an extruder 200 that cooperate with one another. In particular, assembly 2 would allow for rapid repair or replacement of die plates on the order of minutes or seconds as opposed to hours or days. Preferably, the extruder 200 has a generally cylindrical housing 202 with an extruder screw 204 disposed therein. The extruder screw 204 disposed within the housing 202 is adapted to rotate within the housing 202 (along the central axis of the housing 202) to impart mechanical work to an extrudate contained within the housing 202 to form a flow of extrudate in the direction of the assembly 100.

Secured to the extruder 200 is a sealing member 102. Preferably, the sealing member 102 is secured to the exterior of the housing 202 and is adapted to be linearly translatable or telescoped while being secured to the housing 202. While being linearly translatable, the sealing member 102 does have at least two positions: a discharge position and an engaged position. In the discharge position, the sealing member 102 is translated to a position away from the extruder heads 108, leaving a gap between the housing 202 and the extruder heads 108. In the engaged position, the sealing member 102 is translated to a position such that the sealing member 102 engages at least one of the extruder heads 108, providing a generally continuous fluid seal between the housing 202 and one of the extruder heads 108.

The sealing member 102 can further be divided into several portions, namely a driving member 104 and a flange 106. The driving member 104 is the portion of sealing member 102 that is generally responsible for providing a generally continuous fluid seal between the housing 202 and the environment and is generally responsible for providing linear motion, while the flange 106 is generally adapted to engage one of the extruder heads 108 so as to provide a generally continuous fluid seal between one of the extruder heads 108 and the housing 202. Preferably, disposed between the housing 202 and the driving member 104 is a face seal 110 that is secured in a radial groove 112. The face seal 110 can generally be made of a resilient material, preferably TEFLON. The face seal 110 would provide a barrier between the extrudate and the environment so that internal pressure and temperature can be generally maintained. Included with the driving member 104 is an actuator assembly (preferably an electric motor 116 and transmission 118 that employs gears and ACME threads) to move the driving member 104 between the engaged position and disengaged position. Typically, movement from the engaged position to the disengaged position (and vice versa) takes about 5 to 8 seconds. Alternatively, an air gear-motor or pneumatic cylinder assembly can operate as the actuator assembly.

Secured to the end opposite the actuator assembly on the driving member 104 is the flange 106. The flange 106 includes a lip 122 that contacts the at least one of the extruder heads 108. The lip 122 is generally circular and has a generally semicircular or generally curvilinear cross-section with a radius of about ¼ inch.

Adjacent to the extruder 200 is the frame 120. The frame 120 provides mechanical support for the heads 108. As can be seen in FIGS. 1-7, the heads 108 are able to move linearly on the frame 120. In particular, the frame 120, as depicted, has a discharge position located in proximity to the extruder 200 and several storage positions, preferably one storage position for each head 108. When an extruder head 108 is located at the storage position, the sealing member 102 can engage extruder head 108 and an extrudate can be fed through or extruded through the head 108. Additionally, when an extruder head 108 is located at a storage position, the head 108 is not in fluid communication with the extrudate.

Thus, during operation, the sealing member 102 can be moved from an engaged position with one of the extruder heads 108 to the disengaged position, and the extruder head 108 is moved to its storage position. Thereafter, another extruder head 108 can be moved from its storage position to the discharge position, and the sealing member 102 can be moved from the disengaged position to an engaged position with the extruder head 108. To accomplish movement between the storage positions and the discharge position, actuators 124, which are secured to the frame 120 and at least one of the extruder heads 108, are employed. These actuators 124 cause the heads 108 to move linearly on the frame. Preferably, the actuators 124 are comprised on pneumatic cylinders. Typically, it takes about 2 to 3 seconds to move one extruder head 108 from the discharge position to its storage position and move another head 108 from its storage position to the discharge position.

As can be seen in FIGS. 1-7, the extruder heads 108 are further comprised of several components. On the exterior of the heads 108 is a shroud 126, which has a die plate 128 disposed therein. The shroud 126 has a generally hollow interior, and typically includes a knife assembly (not shown) disposed therein that abuts the die plate 128. One reason for having this generally hollow shroud 126 is to insulate the cutting assembly (not shown) from the environment to prevent items from interfering with the cutting assembly (not shown). Additionally, the shroud 126 allows for directional control of the extruded product (dropped through the bottom by gravity or through the top by a vacuum system).

Figure 7:
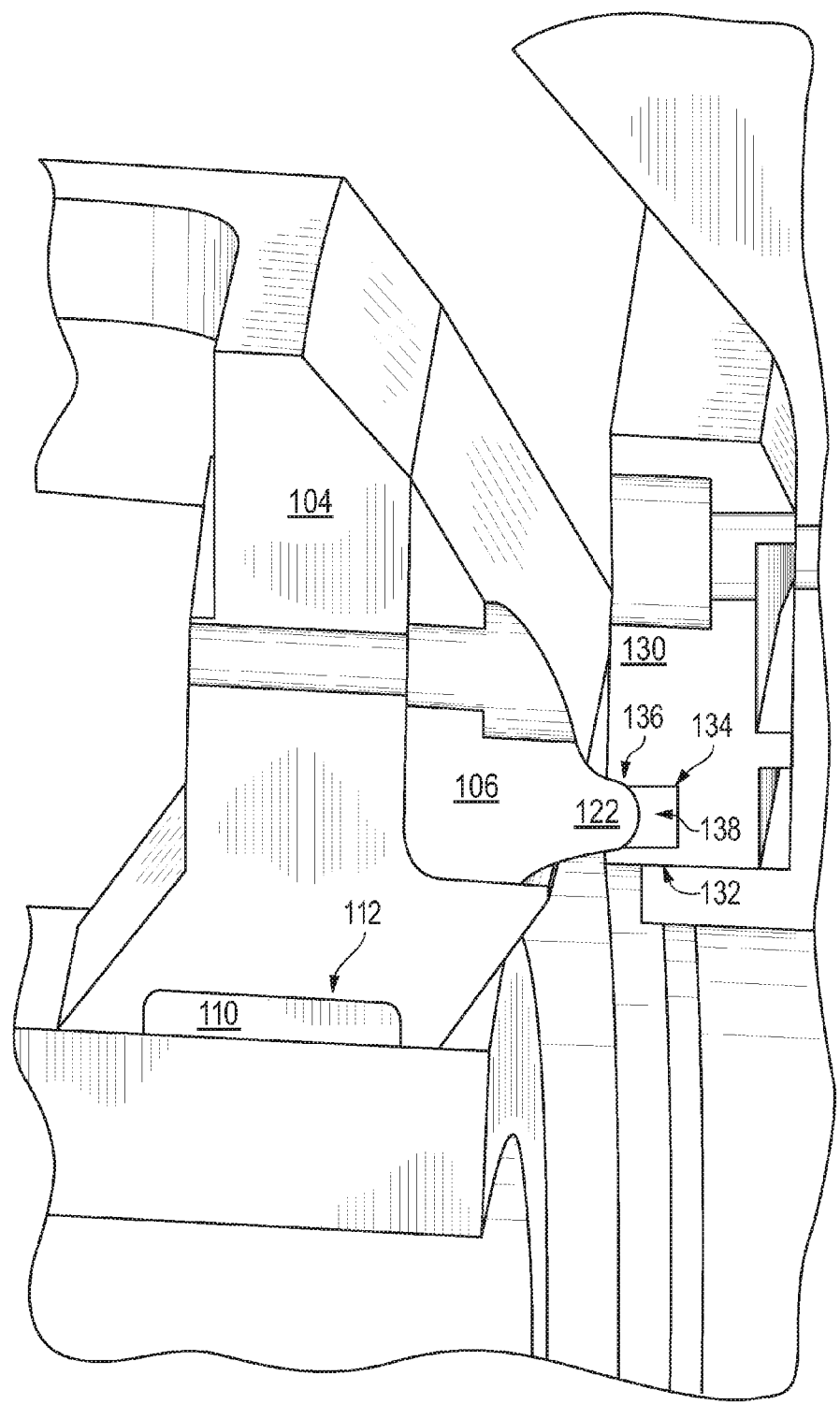
FIG. 7 is an exploded view of FIG. 6 along section line B.

A seating assembly 130 is secured to the shroud 126. The seating assembly 130 is the portion of the head 108 that is in fluid communication with the extruder 200, when engaged. Typically, the die plate 128 is secured to the seating assembly 130 as a "free-floating" assembly, where the die plate 128 is secured into its position with a single push rod actuated by an air cylinder (not shown) to prevent rotation of the die assembly during extrusion. Thus, this arrangement would allow the knife assembly (not shown) to be held in an interference relationship with the die plate 128 during actuation of the heads 108 and would allow for easy removal of die plate 128 when the head 108 is in its storage position. Opposite the die plate 128, the seating assembly 130 includes a generally circular seat 132, having a diameter that is approximately equal to the diameter of the lip 122. Formed in the seat 132 is a groove 134, which is generally coextensive with at least a portion of the seat 132. On either side of the groove 134 are mating portions 136 that have a generally curvilinear cross section and are generally adapted to have a shape that can engage at least a portion of the lip 122. As can be seen in FIG. 7, the groove 134 has a generally rectangular cross section, and a seal 138 is secured in the groove 134. This seal 138 is formed of a resilient material, such as TEFLON, that is adapted to engage at least a portion of the lip 122. When under pressure and engaging the lip 122, the seal 138 is deformed and compressed to form a generally continuous fluid seal between the extrudate and the environment.

Therefore, by having a sealing member 102 that can rapidly engage and disengage heads 108 and by having the heads 108 rapidly movable between positions, it is a relatively simple procedure to replace a die plate, such as die plate 128, or make a repair. Thus, the throughput of the extruder assembly 2 can be dramatically increased by reducing the downtime of the extruder assembly 2 between changes to the die plate 128 or to make other repairs.

Figure 4:
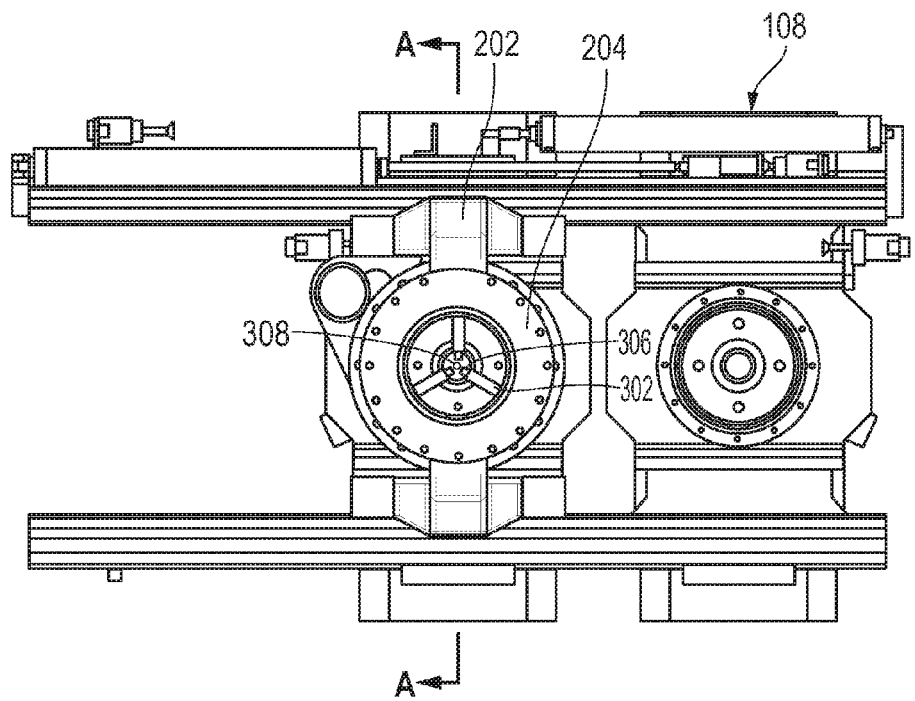
FIG. 4 is a rear elevation of the extruder assembly of FIG. 1.
Figure 5:
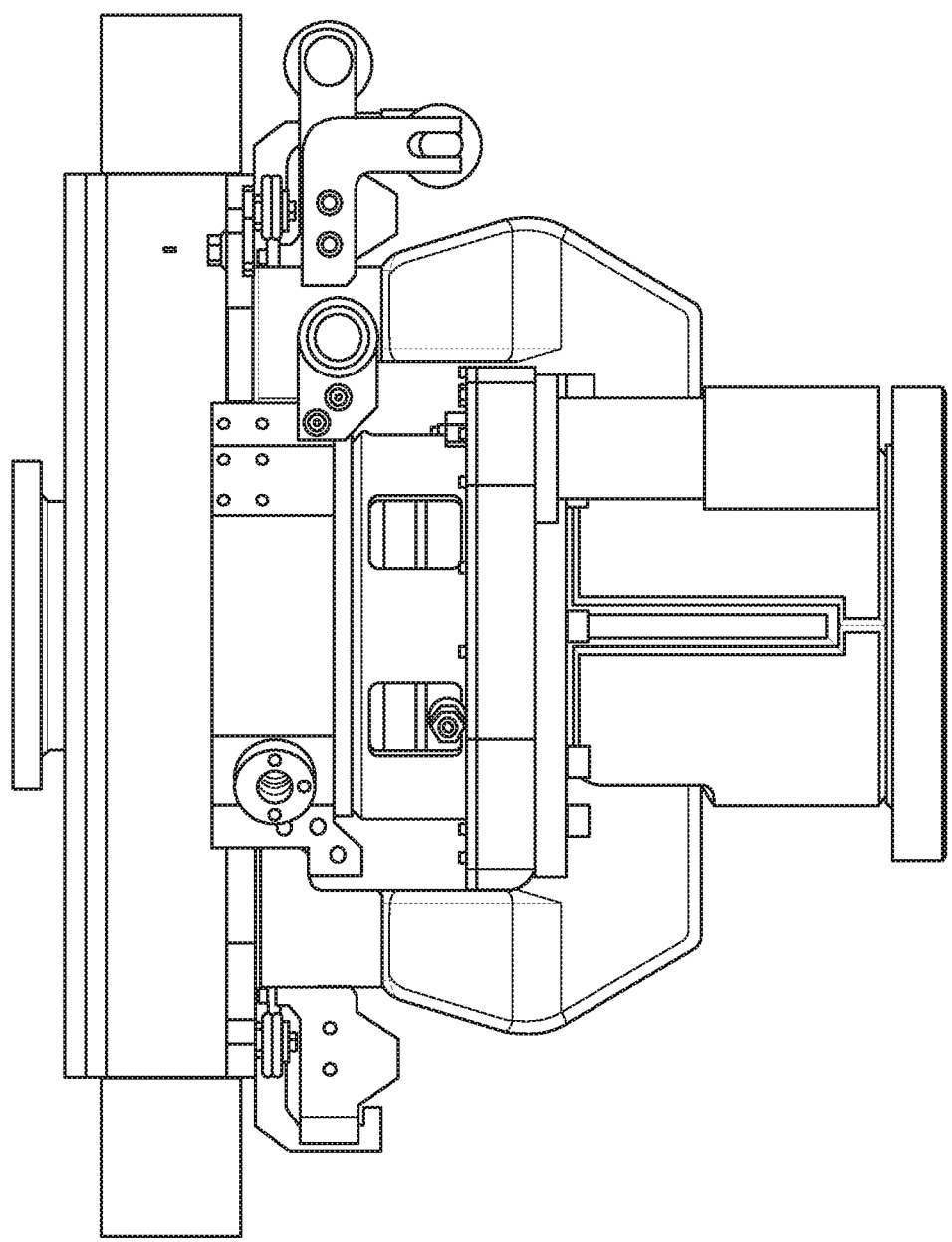
FIG. 5 is a side elevation of the extruder assembly of FIG. 1.
Figure 6:
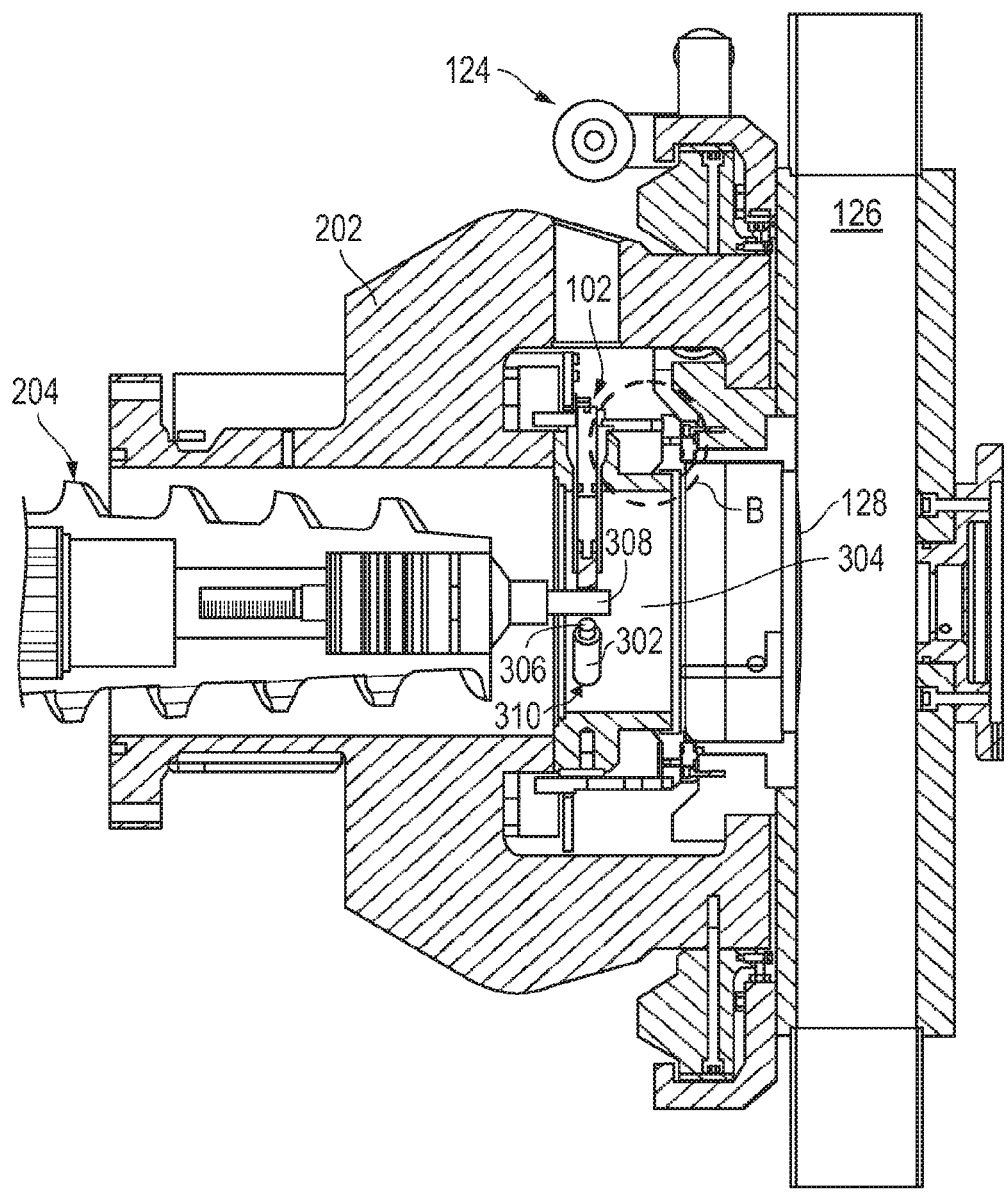
FIG. 6 is a cross-sectional view of the extruder assembly of FIG. 4 along section line A-A.
Figure 8:
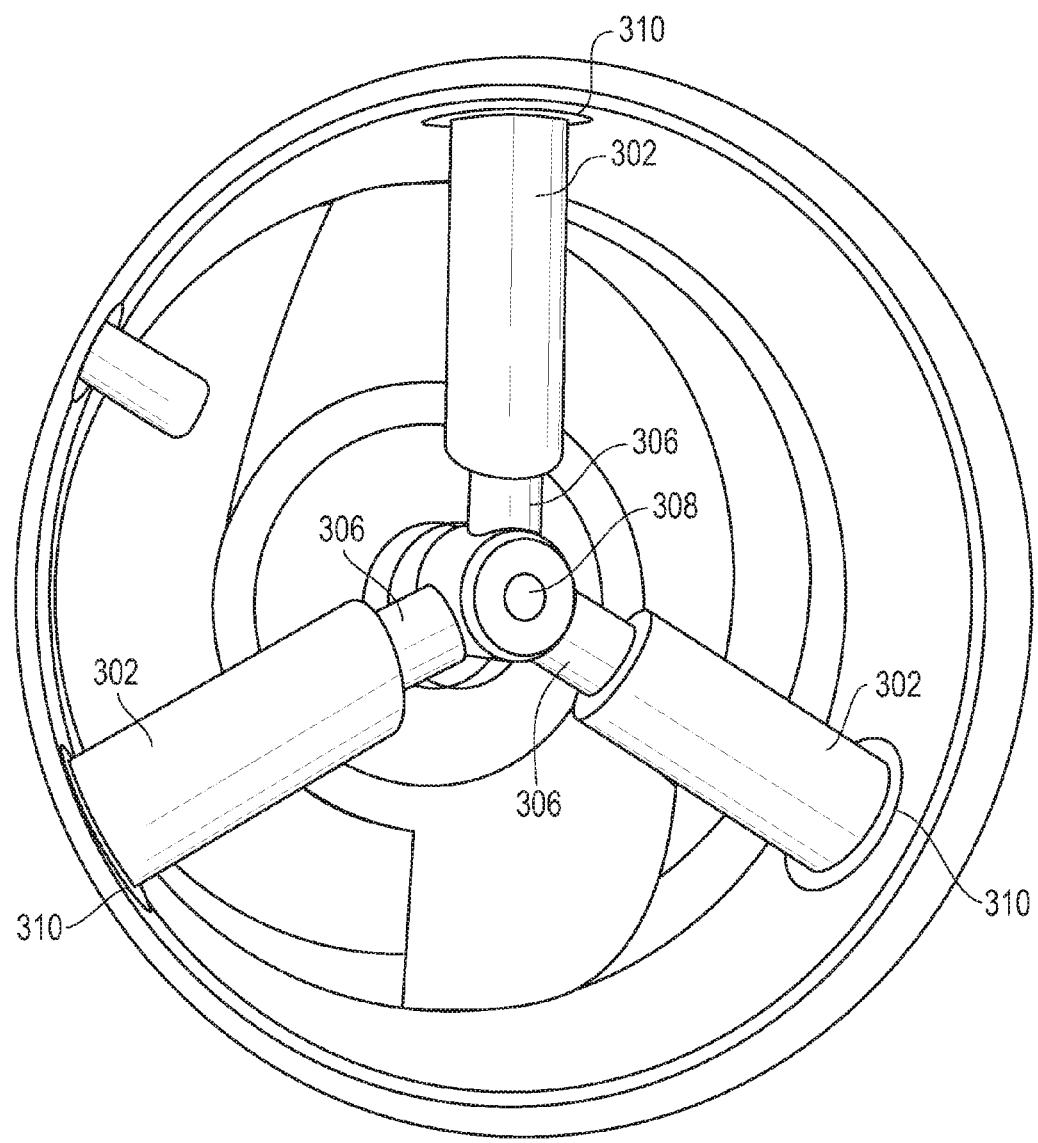
FIG. 8 is a rear elevation of the stabilizer assembly of FIG. 4.

Referring to FIGS. 4, 6, and 8, a stabilizer assembly according to the present invention is illustrated. The stabilizing assembly comprises a plurality (preferably three or more, as illustrated) of steel rods or cylinders 302 that are secured to the inner diameter or wall of the end of barrel or housing 202 and contact and support the discharge end 304 of screw 204. The rods or cylinders preferably are equally spaced (120 degrees apart in the case of three) about the circumference of the inner diameter or wall of barrel or housing 202 and extend radially inwardly toward the geometric center of barrel or housing 202. A tungsten carbide cylinder or portion 306 may be brazed, secured by threads, or otherwise secured into a recess in the end of each of the rods or cylinders 302. The end of each cylinder 306 preferably bears on the outer diameter of a tungsten carbide shaft or bearing member 308 that is brazed or otherwise secured in a recess in the discharge end 304 of screw 204. The ends of rods or cylinders 302 may be secured by threads into recesses 310 in the inner diameter or wall of the barrel or the housing 202.

The stabilizing assembly according to the present invention thus centers and stabilizes the rotation of screw 204 in barrel or housing 202. Contact between the brittle, wear-resistant material on the screw flites and the inner diameter or wall of barrel or housing 202 is reduced or eliminated and the integrity of the brittle wear-resistant material is maintained. The bearing point contacts between the tungsten carbide cylinders 306 and the shaft 308 provides a low-friction, highly wear-resistant bearing. Further, the use of rods or cylinders 302 to support the bearing points minimizes the area of barrel or housing 202 that is obstructed at the discharge end 304, allowing extrudate to pass freely by the stabilizer assembly. The threaded connection 310 between each rod or cylinder 302 and barrel or housing 202 permits the stabilizer assembly to be finely adjusted to center and align screw 204 in barrel or housing 202 and to compensate for wear in the contact points. The diameter of tungsten carbide cylinders 306 and shaft or bearing member 308 should be kept as small as possible to minimize friction.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A stabilizer assembly for use in an extruder having a housing in which a flited screw rotates, the assembly comprising:
   three rods, each rod secured to the housing at one end thereof, and each rod having an end extending radially inwardly toward a center of the housing;
   a bearing tip on the end of each rod, the bearing tips being formed of tungsten carbide; and
   a bearing surface formed on a shaft of the screw, the bearing surface contacting the bearing tip of each rod.

2. The stabilizer assembly of claim 1, wherein the three rods are secured to the housing by threaded connections.

3. The stabilizer assembly of claim 1, wherein the three rods are made of steel.

4. The stabilizer assembly of claim 1, wherein the three rods are equally spaced from each other along the circumference of the housing.

5. The stabilizer assembly of claim 1, wherein the bearing surface formed on the shaft comprises tungsten carbide.

6. The stabilizer assembly of claim 1, wherein each of the bearing tips made of tungsten carbide has a smaller diameter than a diameter of each rod.

7. A stabilizer for an extruder, comprising:
   a plurality of rods, each rod coupled to a housing at one end and having an opposite end extending radially toward a center axis of the housing;
   a bearing tip on the end of each rod being formed of wear-resistant material; and
   a bearing surface rotating with a shaft of an extruder screw and contacting the bearing tip of each rod.

8. The stabilizer assembly of claim 7, wherein the plurality of rods comprises at least three rods.

9. The stabilizer assembly of claim 8, wherein the plurality of rods comprises only three rods.

10. The stabilizer of claim 7, wherein a plurality of flights of the extruder screw is at least partially covered with wear resistant material.

11. The stabilizer of claim 10, wherein the wear-resistant material at least partially covering the plurality of flights is the same as the wear-resistant material of the bearing tips.

12. The stabilizer of claim 7, wherein the wear-resistant material is brazed onto each bearing tip.

13. The stabilizer of claim 7, wherein each bearing tip is threaded to the end of each respective rod.

14. The stabilizer of claim 7, wherein a bearing point contact of each bearing tip to the bearing surface is independently adjustable.

15. The stabilizer of claim 14, wherein each rod is coupled to the housing by a threaded connection, the threaded connections providing the independent adjustability of the bearing point contact.

16. An extruder, comprising:
    a housing;

an extruder screw rotatable within the housing and having a shaft, a discharge end of the shaft having a bearing surface;

a plurality of rods, each rod coupled to the housing at one end and having an opposite end extending radially toward a center axis of the housing; and a bearing tip on the end of each rod, the bearing tips being formed of a wear-resistant material and contacting the bearing surface of the discharge end of the shaft.

17. The extruder of claim 16, wherein the bearing surface of the shaft is at least partially covered with a second wear-resistant material, the second wear-resistant material being the same as the wear-resistant material.

18. The extruder of claim 16, wherein a bearing point contact of each bearing tip to the bearing surface of the shaft is independently adjustable.

19. The extruder of claim 18, wherein each rod is coupled to the housing by a threaded connection, the threaded connections providing the independent adjustability of the bearing point contact.

* * * * *

UNITED STATES PATENT AND TRADEMARK OFFICE
CERTIFICATE OF CORRECTION

PATENT NO. : 8,579,623 B2  
APPLICATION NO. : 12/762509  
DATED : November 12, 2013  
INVENTOR(S) : Edward E. Williams et al.

It is certified that error appears in the above-identified patent and that said Letters Patent is hereby corrected as shown below:

In the Specification

Column 1, lines 5-12 the Priority Claim and Cross-Reference to Related Application section is replaced as follows:

-- This application claims priority to Provisional Application No. 61/170,816 filed on Apr. 20, 2009 and entitled "Extruder Stabilizer Assembly." Also, this application is a continuation-in-part application of patent application Ser. No. 12/100,964 filed on Apr. 10, 2008 and entitled "Multi-Head Extruder Assembly," now abandoned and hereby incorporated by reference for all purposes; and a continuation-in-part patent application of Ser. No. 12/100,934 filed on April 10, 2008, entitled "Thermal Growth Compensating Extrusion Screw Assembly," also now abandoned. --

Signed and Sealed this  
Fourth Day of February, 2014

Michelle K. Lee  
*Deputy Director of the United States Patent and Trademark Office*